United States Patent
Poschmann et al.

(10) Patent No.: US 6,180,081 B1
(45) Date of Patent: Jan. 30, 2001

(54) REACTOR UNIT FOR A CATALYTIC CHEMICAL REACTION, ESPECIALLY FOR A CATALYZING METHANOL REFORMER

(75) Inventors: Thomas Poschmann, Ulm; Steffen Wieland, Stuttgart, both of (DE)

(73) Assignee: Xcellsis GmbH, Kirchheim/Teck-Nabern (DE)

( * ) Notice: Under 35 U.S.C. 154(b), the term of this patent shall be extended for 0 days.

(21) Appl. No.: 09/275,798

(22) Filed: Mar. 25, 1999

(30) Foreign Application Priority Data

Mar. 25, 1998 (DE) .............................. 198 13 053

(51) Int. Cl.[7] .............................. C01B 3/02; C01B 3/24; C01B 3/26; B01J 8/04; B01J 35/02
(52) U.S. Cl. .................. 423/648.1; 252/373; 423/650; 423/652; 423/659; 422/190; 422/211; 422/212; 422/220; 422/239
(58) Field of Search ................ 252/373; 423/648.1, 423/650, 652, 659; 422/196, 197, 188, 189, 190, 193, 211, 212, 299, 220; 48/61, 127.9, DIG. 5; 95/55

(56) References Cited

U.S. PATENT DOCUMENTS

| | | | |
|---|---|---|---|
| 4,981,676 | 1/1991 | Minet et al. | 423/652 |
| 5,229,102 | * 7/1993 | Minet et al. | 423/652 |
| 5,409,609 | 4/1995 | Soria et al. | 210/321.72 |
| 5,451,386 | 9/1995 | Collins et al. | 423/237 |
| 5,637,259 | * 6/1997 | Galuzka et al. | 252/373 |
| 5,674,301 | 10/1997 | Sakai et al. | 48/61 |
| 5,772,707 | * 6/1998 | Wiesheu et al. | 48/197 R |
| 5,861,137 | * 1/1999 | Edlund | 423/652 |
| 5,980,840 | * 11/1999 | Kleefisch et al. | 422/211 |

FOREIGN PATENT DOCUMENTS

| | | |
|---|---|---|
| 691 07 096 T2 | 5/1995 | (DE) . |
| 44 23 587 | 1/1996 | (DE) . |
| 197 57 506 | 1/1998 | (DE) . |
| 0 154 295 A1 | 9/1985 | (EP) . |
| 0 442 410 A1 | 8/1991 | (EP) . |
| 0 450 872 A1 | 10/1991 | (EP) . |
| 2 283 235 | 5/1995 | (GB) . |
| 3-109202 | 5/1991 | (JP) . |

* cited by examiner

*Primary Examiner*—Tom Dunn
*Assistant Examiner*—Maribel Medina
(74) *Attorney, Agent, or Firm*—Evenson, McKeown, Edwards & Lenahan, P.L.L.C.

(57) ABSTRACT

A reactor unit includes a monolithic block with several parallel reaction chamber lengthwise channels into which a reaction starting product can flow, which contain a suitable reaction catalyst material, and which are delimited externally by membrane walls for the selective separation of a desired reaction component from the reaction end product. A catalytic burner is accommodated in at least some of the lengthwise channels.

9 Claims, 1 Drawing Sheet

REACTOR UNIT FOR A CATALYTIC CHEMICAL REACTION, ESPECIALLY FOR A CATALYZING METHANOL REFORMER

BACKGROUND AND SUMMARY OF THE INVENTION

This application claims the priority of German Patent Application No. 198 13 053.8, filed Mar. 25, 1998, the disclosure of which is expressly incorporated by reference herein.

The present invention is directed to a reactor unit.

Reactor units for catalytic chemical conversion of a gaseous or liquid reaction starting product into a reaction end product that contains a gaseous or liquid reaction component, which is selectively separable by membrane diffusion, are used, for example, for steam reforming of methanol. In steam reformation of methanol, the reaction end product is a hydrogen-rich mixture containing a certain proportion of carbon monoxide. The use of such reactor units in mobile applications (e.g., in fuel cell powered motor vehicles) in order to obtain the hydrogen required for the fuel cells from liquid methanol carried on board is known.

Since carbon monoxide has a harmful influence on the fuel cells, the reaction end product requires suitable chemical treatment. One known possibility is the selective separation of the hydrogen by membrane diffusion. For mobile applications, particularly automotive engineering, it is desirable for reasons of space and dynamics for the reactor to be compact and easy to construct with as few components as possible, thereby minimizing regulation and control units and at the same time aiming for high efficiency.

U.S. Pat. No. 4,981,676 discloses a reactor unit for steam reforming of a hydrocarbon, in particular methane, containing a tubular reaction chamber filled with a suitable catalyst pellet charge. The reaction chamber is delimited externally by a metal wall that is externally heatable by a burner supplied with a fuel/air-gas mixture, which is burned in an open flame. The heat generated by the burner can be used to heat the system rapidly or to maintain a suitable elevated reaction temperature in the case of endothermic chemical reactions. On the inside, the reaction chamber is composed of a tube acting as a hydrogen separating membrane with a corresponding porous ceramic tube wall.

Reforming reactor units have been proposed in which, in addition to a hydrogen separating membrane, a burner designed to carry out catalytic combustion is integrated with the reaction chamber itself into a single unit. See, for example, German Patent Application 197 57 506; U.S. patent application Ser. No. 09/210,894 filed Dec. 16, 1998.

U.S. Pat. No. 5,451,386 discloses a reactor unit containing a membrane tube with a selectively hydrogen-permeable wall. The interior of the tube forms the reaction chamber, which contains suitable catalyst particles in order to obtain hydrogen by catalytic decomposition of ammonia or hydrogen sulfide, for example.

Membranes for separating a desired reaction component from a mixture of substances containing this component, particularly for separating hydrogen from a mixture containing hydrogen, are already used in various designs and consist of various materials. One known design is the monolithic block with several parallel lengthwise channels delimited by porous membrane walls that are selectively permeable for the desired reaction components. The mixture from which the desired reaction components are to be separated is conducted through the interior lengthwise channels. Membrane blocks of this type are used, for example, for filtration or separation purposes or used in catalytic chemical reactions. In catalytic chemical reactions, the catalyst material can be added to the block material. See EP 0 442 410 A1, U.S. Pat. No. 5,409,609, and German Patent 691 07 096 T2. German Patent 691 07 096 T2 teaches the use of the membrane device described therein as a reactor unit.

European patent document EP 0 450 872 A1, incorporated by reference herein in its entirety, describes a reactor unit for conducting an endothermic catalytic reaction of a gaseous or liquid reaction starting product into a reaction end product. The reactor unit contains a cylindrical reaction chamber traversed by one or more ceramic burner tubes extending in the lengthwise direction of the cylinder and at a distance from one another. A fuel inlet tube is inserted coaxially into each burner tube.

The object of the present invention is to provide a reactor unit that is relatively compact and easy to build, and has high conversion efficiency.

The reactor unit according to the present invention achieves this object. The reactor unit contains a monolithic block with several parallel lengthwise channels in the reaction chamber, into which the reaction starting product can flow and which contain a suitable reaction catalyst material. The channels are delimited externally by walls that are membranes for the selective separation of the desired reaction components from the reaction end product. At least some of these lengthwise channels each have their own catalytic burner (1) to generate, by a flameless catalytic combustion process, heat for rapid heating of the reaction chamber formed by the lengthwise channels; and/or (2) to maintain a sufficiently high reaction temperature to carry out the desired catalytic chemical reaction in the reaction chamber, particularly for an endothermic reaction.

Integration of both a separating membrane and a catalytic burner into a monolithic block that forms the reaction chamber with its lengthwise channels makes possible a particularly compact design of the reactor unit with a given efficiency. The block can be made low in weight and relatively inexpensively, for example, as an extruded profile. The compact design is favorable for rapid dynamic behavior of the reactor unit under varying load conditions, such as occur in mobile applications in motor vehicles. The reactor unit can thus be used in particular to obtain hydrogen by steam reforming of methanol in fuel cell powered motor vehicles.

In an embodiment of the present invention, each catalytic burner has a burner tube inside its reaction chamber lengthwise channel. The burner tube has a suitable burner catalyst material inside for catalytic combustion of a fuel fed into the interior of the burner tube. In a further embodiment of this reactor unit, the burner catalyst material is applied to the inside of the burner tube as a coating.

In another embodiment of the reactor unit according to the present invention, the block walls functioning as separating membranes are made of a porous carrier material provided with a separation-active coating. The separation-active coating contains one or more finely porous separation-selective plastic and/or ceramic layers and/or a metal layer made of a separation-selective metal material. The block walls so made have high selectivity for separation of the desired reaction components (e.g., hydrogen) from a reaction end product containing hydrogen.

In another embodiment according to the present invention, it collecting channels running transversely are formed in the block, through which channels the reaction components that diffuse selectively through the membrane walls of the block can be removed separately from the remaining components of the reaction end product.

Other objects, advantages and novel features of the present invention will become apparent from the following detailed description of the invention when considered in conjunction with the accompanying drawings.

DETAILED DESCRIPTION OF THE DRAWINGS

Figure 1:
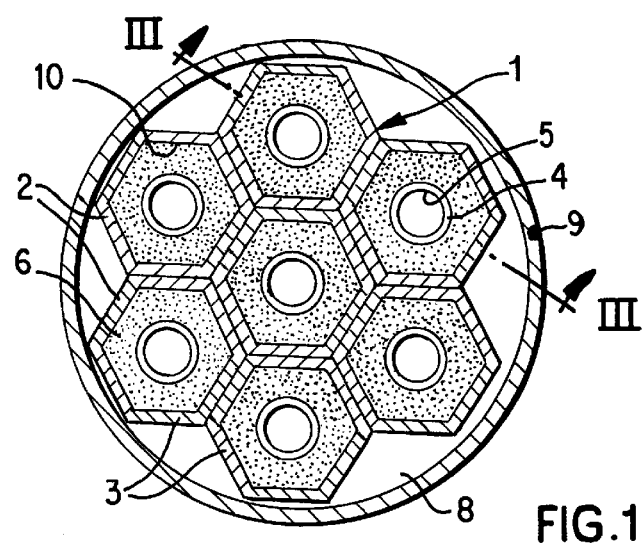
FIG. 1 is a cross-sectional view of a monolithic block reactor unit for steam reforming of methanol.
Figure 2:
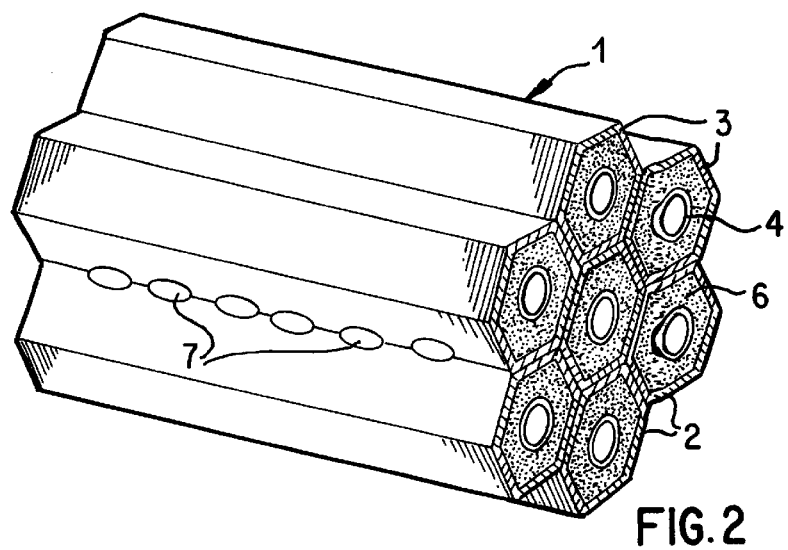
FIG. 2 is a schematic perspective view of the block of FIG. 1.
Figure 3:
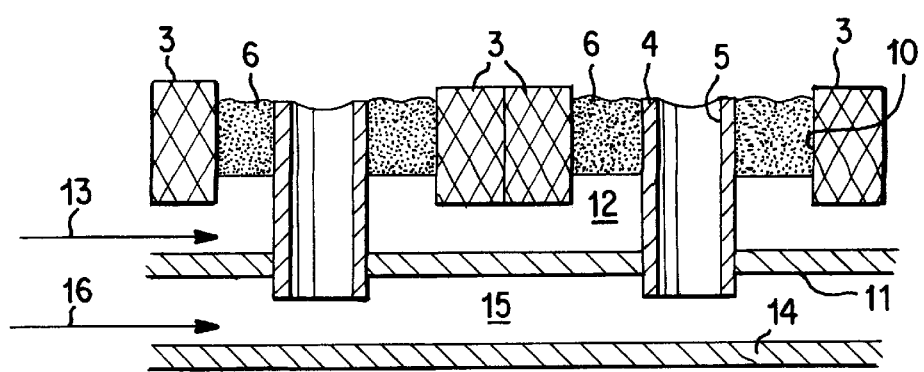
FIG. 3 is a lengthwise sectional view of an end region of the reactor unit of FIG. 1 taken along line III—III in FIG. 1.

The reactor unit shown in FIGS. 1 to 3 is designed for steam reforming of methanol, for example, for mobile applications in a fuel cell powered motor vehicle, in order to obtain the hydrogen required for the fuel cells from liquid methanol carried on board. The reactor unit, which has a compact design, contains a monolithic block 1 with seven parallel reaction chamber lengthwise channels 2, delimited externally by block walls 3 that are hexagonal and honeycomb-shaped in cross section. The seven lengthwise channels 2 have side walls that abut one another in continuous honeycomb fashion (i.e., a central lengthwise channel is surrounded by the other six lengthwise channels with the same angular spacing). Block 1 can be mass-produced on a large scale as an extruded profile and can be made low in weight.

A burner tube 4 is accommodated coaxially inside each reaction chamber lengthwise channel 2. The tube is provided internally with a coating 5 made of a suitable burner catalyst material and thus forms a catalytic burner for the reaction chamber lengthwise channel 2. The reaction chamber itself, in which the methanol reforming reaction takes place, is composed of the seven parallel annular chambers 6 between the respective burner tubes 4 and walls 3 of the associated reaction chamber lengthwise channels 2. Each of these reaction chambers 6 is filled with a suitable catalyst material (e.g., a Cu/ZnO/Al$_2$O$_3$ material), which can be made in the form of a pellet charge or a corresponding catalyst foam body. Alternatively, the reforming catalyst material can be applied to the insides of walls 3 as a layer or a porous liner.

Monolithic block 1 is made as a porous block. Walls 3 of reaction chamber lengthwise channels 2 consist of a porous material, such as sintered ceramic, glass, metal foam, carbon, or plastic in the porous form. Internally, porous walls 3 are provided with a separation-active coating 10 made of one or more finely porous plastic and/or ceramic layers, chosen such that walls 3 are hydrogen-permeable overall and have high separation selectivity for hydrogen. Alternatively or additionally, a metal layer can be provided for the selectively hydrogen separation-active coating 10, which is preferably formed of one or more metals in the IVb, Vb, and VIII groups or is an alloy thereof. Porous walls 3 thus function as membranes for effective and highly selective separation of the hydrogen from the hydrogen-rich reaction end product of methanol reforming.

As shown schematically in FIG. 2, cross channels 7 are accommodated in block 1 in the vicinity of porous walls 3 in such fashion that they do not connect with the annular chambers 6 of reaction chamber lengthwise channels 2 forming the reaction chamber. Thus, the hydrogen formed in the reaction chamber (i.e., in annular chambers 6) can be separated by the porous walls 3 that act as separating membranes in a highly pure form from the remaining components of the reaction end product of the methanol reforming reaction and carried out of block 1 through cross channels 7.

As can be seen in FIG. 1, block 1 is placed in a gastight pressure container 9 of the reactor unit leaving a hydrogen collecting chamber 8. The hydrogen that flows out of block 1 through cross channels 7 thus collects in collecting chamber 8 and can be removed from the reactor unit from the collecting chamber and supplied, for example, to the fuel cells of a fuel cell powered vehicle.

In operation of the reactor unit, the starting reaction mixture (i.e., a hydrogen/methanol mixture) is fed through annular chambers 6 filled with reforming catalyst, where the reforming reaction takes place, by which a hydrogen-rich reformate gas is produced as the reaction end product. Since this is an endothermic reaction, which can take place effectively only in a temperature range higher than room temperature, annular chambers 6 are continuously supplied with sufficient heat. Suitable reaction temperatures are, for example, in the range between 150° C. and 650° C. For this purpose, the catalytic burners are operated while a suitable fuel, for example the exhaust gases from an associated fuel cell system or a portion of the hydrogen formed by methanol reforming, is conducted into burner tubes 4 where it undergoes flameless catalytic combustion under the influence of burner catalyst layer 5. Burner tubes 4 give off the heat generated externally to the respective surrounding annular reaction chamber 6. It should be understood that for this purpose burner tubes 4 are made from a material that is a good heat conductor.

If necessary, each time the reactor unit is started, the combustion process is initially activated in the catalytic burner only in order to heat annular reaction chambers 6 rapidly to the temperature suitable for methanol reforming, before the steam/methanol mixture is conducted into annular reaction chambers 6 and the reforming reaction is started.

FIG. 3 shows a section of the end region of the reactor unit on the in-flow side in lengthwise cross section. As can be seen from this figure, burner tubes 4 are fitted into associated openings in a first cover plate 11, while block 1 with porous walls 3 and reforming catalytic charges in annular reaction chambers 6 remains at a certain distance from this first cover plate 11. Because of this, a reaction starting product distribution chamber 12 is formed between them, to which the steam/methanol mixture 13 to be reformed is conducted, where it is uniformly distributed into the various parallel annular reaction chambers 6. A second cover plate 14 is disposed on the side of first cover plate 11 that faces away from the block and at a certain distance from said plate in such a way that a fuel distribution chamber 15 is formed between the two cover plates 11 and 14, and burner tube 4 terminates in this chamber. The fuel 16 to be burned catalytically is fed from the outside into this fuel distribution chamber 15 and proceeds therefrom to parallel burner tubes 4. An analogous connection diagram is chosen for the end region of the reactor unit on the outlet side, which does not need to be illustrated or explained in greater detail.

It must be understood that, in addition to the example shown, other designs of the reactor unit according to the present invention with the advantages referred to are possible. Thus, the reactor unit according to the present invention can be composed of several monolithic blocks as needed, and the block in question can contain any desired number of parallel reaction chamber lengthwise channels. Alternatively to the hexagonal cross-sectional shape depicted, the reaction chamber lengthwise channels may have any other cross-sectional shape, for example they may be round or rectangular. Also, the reactor unit according to the present invention can be employed not only for methanol reforming but also, using the catalyst material suitable for the particular application, for any other catalytic chemical reactions in which a gaseous or liquid starting reaction product is converted into a reaction end product that contains a gaseous or liquid component selectively separable by membrane diffusion and useful for heating.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reactor unit for catalytic chemical conversion of a gaseous or liquid reaction starting product into a reaction end product that contains a gaseous or liquid reaction component, said reactor unit comprising a monolithic block, said monolithic block comprising:

a plurality of parallel reaction chamber channels containing a catalyst material and having an outer wall comprising a membrane for selectively separating the gaseous or liquid reaction component; and at least one reaction chamber channel containing a catalytic burner.

2. A reactor unit according to claim 1, wherein the catalytic burner comprises:

a burner tube located parallel inside the at least one reaction chamber channel into which a fuel to be burned catalytically can flow; and a burner catalyst material inside the burner tube.

3. A reactor unit according to claim 2, wherein the burner catalyst material is an internal coating of the burner tube.

4. A reactor unit according to claim 1, wherein the membrane wall comprises a porous carrier material having a separation-active coating.

5. A reactor unit according to claim 4, wherein the separation-active coating comprises one or more layers of a porous material selected from the group consisting of plastic, ceramic, metal, and combinations thereof.

6. A reactor unit according to claim 1, further comprising a plurality of collecting channels traversing the monolithic block for removing the reaction component which selectively diffuses through the membrane wall.

7. A reactor unit according to claim 1, wherein the catalytic chemical conversion comprises steam reformation of methanol.

8. A reactor unit according to claim 1, wherein the reaction component is hydrogen.

9. A method for separating a reaction component from a reaction end product, comprising:

feeding a gaseous or liquid reaction starting product to a reactor unit according to claim 1;

catalytically converting the reaction starting product to a reaction end product that contains a gaseous or liquid reaction component; and separating the reaction component from the reaction end product by membrane diffusion.

* * * * *